United States Patent Office 3,258,495
Patented June 28, 1966

3,258,495
THIOL TERMINATED POLYOXYALKYLENE GLYCOLS
Gene M. Le Fave, Whittier, Frank Y. Hayashi, San Pedro, and Abe W. Fradkin, Santa Monica, Calif., assignors, by mesne assignments, to Diamond Alkali Company, Cleveland, Ohio, a corporation of Delaware
No Drawing. Filed May 27, 1963, Ser. No. 283,593
9 Claims. (Cl. 260—609)

This invention relates to thiol terminated polyoxyalkylene glycols, processes for the production thereof, and elastomers producible therefrom.

This is a continuation-in-part of application Serial No. 232,861, filed October 24, 1962, entitled, Thiol Terminated Polyoxyalkylene Glycols (now abandoned).

In pending application Serial No. 92,444, filed March 1, 1961, there is disclosed certain liquid thiol terminated polymers which are convertible into useful elastomers by well known techniques. These elastomers, for the most part, can be cast in place in a liquid or paste phase and subsequently cured at ambient temperatures and pressures. As noted in said pending application, they are useful in the electrical industry as potting, insulating and encapsulating compounds, in the building and aircraft industry as sealants, coatings and caulking and glazing compounds, and in the missile industry as solid fuel binders.

As noted in said pending application Serial No. 92,444, the glycols may be thiol terminated through the creation of an intermediary such as a halohydrin in which the halogen is subsequently replaced by thiol. It was further noted that the thiol replacement of the halogen may take place directly, if desired, although it was preferred to effect such replacement indirectly as for example with the use of a thiosulfate, because the direct replacement reaction did not proceed to as high a degree of completion as was desirable. The present invention involves the discovery of a process for effecting direct replacement of the halogen with thiol, in which the reaction is caused to proceed to a degree of completion which is quite satisfactory from a commercial standpoint.

In general, the essence of the present invention involves a control of the terminal pH in the replacement reaction to a value below that which will cause the filtered resin to be unstable and become air oxidized. It has been found that this value must be below pH 9.5 and is preferably maintained below 7.5. During the reaction the pH is maintained sufficiently low to prevent gelation. Maintenance of the pH as required may be effected by a number of ways, the preferable method being to employ sufficient thiol reactant (usually sodium sulfhydrates) to keep the pH below the critical value. Alternatively an acidic buffer may be used to maintain the pH below gelation during the reaction and to effect a terminal pH below that which will cause gelation of the unfiltered resin, which in the upper limit has been found to be about pH 9.5.

A distinct advantage of the present invention is that it may be effected entirely with commercial reactants, that is, reactants having the usual commercial degree of purity (or impurity); and the yields of the desired end products are not only sufficiently high in quality to be commercially useful, but also are sufficiently high in quantity through the substantial completion of all reactions, so that only minimal unuseable by-products are left.

Another advantage is that the reactions do not require the use of a solvent, with its well known attendant disadvantages.

In general, the liquid polymers resulting from the instant process have a viscosity of from 100 to 120,000 centipoises and an equivalent weight of at least 150 as determined by the mercaptan equivalent. The starting material is one or more hydroxy terminated liquid polyoxyalkylene glycol polymers, each of which has a molecular weight of at least 400, and which are the condensation products of an alkylene oxyide having from 2 to 4 carbon atoms and about 0.01 to 17.0 mole percent, based on the alkylene oxide, of a polyhydric alcohol having less than 10 carbon atoms and having 3 to 6 hydroxy groups. The glycol is reacted with an epihalohydrin (preferably chloro or bromo) to produce an intermediate halohydrin, which is then in turn reacted with an alkali metal sulfhydrate to produce the desired end product, viz., the thiol terminated polyoxyalkylene glycol, with the alkali metal halide as a by-product.

In accordance with the present invention, it has been discovered that the last reaction can be made commercially feasible if the pH is maintained, during the reaction, sufficiently low to prevent gelation and so adjusted that the terminal pH is below that which will cause gelation of the unfiltered resin, which in the upper limit has been found to be about pH 9.5.

This is preferably done by employing an excess of alkali metal sulfhydrate in an amount below that which will cause gelation during reaction, and below that which will result in a terminal pH over 9.5. It has been found that the quantity should be at least stoichiometrically equivalent to the amount of starting polyol plus an excess in such an amount as to create a system with a pH of less than 9.5. Functionally the criterion is to maintain the pH sufficiently low to prevent gelation, and it has been found in practice that the terminal pH should be below that which will cause gelation of the unfiltered resin. A stoichiometric amount, or no more than 10% excess, has been found in most instances to be quite satisfactory to maintain the reaction and terminal pH in the range from 6.5 to 7.5. 7.5 is thus the preferred maximum terminal pH. However, greater excesses can be tolerated to the extent that gelation does not occur during reaction, or to the extent that the terminal pH is below that which will cause gelation of the unfiltered resin. Preferably, both from an economic and practical standpoint, the highest tolerable excess is of the order of 20% to 30%.

Diagrammatically, the reaction may be represented as follows:

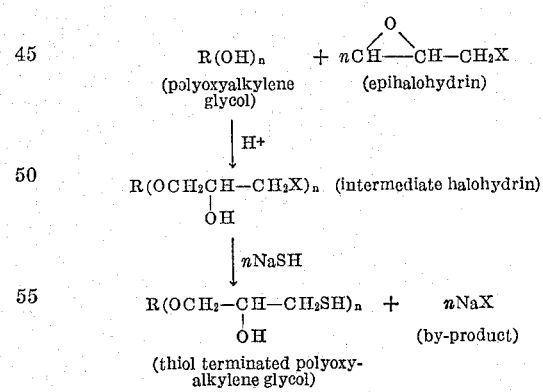

In the above formula $R(OH)_n$ is a polyoxyalkylene glycol polymer. $n$ is the number of active hydroxy groups on the hydroxy terminated polymer. In actual practice $n$ usually varies slightly from the theoretical, and ranges generally between slightly more than two and up to six. It thus follows that it is also the theoretical number of epihalohydrin molecules, of halohydrin termination, of sodium sulfhydrate molecules, and of thiol termination. In actual practice, $n$ of halohydrin termination and $n$ of thiol termination may be less than the theoretical, because of less than 100% reactivity and also because of some chain extension. For the halogen, X, chlorine, bromine, or iodine may be used.

The addition of epihalohydrin to the glycol is done by usual techniques and normally catalyzed by an acid as is well known in the art. The amount of epihalohydrin ranges from a stoichiometric equivalent to not more than 15% excess. The preferred amount is about 10% excess.

For the second step, in which the pH is controlled, a technical grade of flake sodium sulfhydrate has been found to be an excellent reactant. It is a commercial product, having approximately the following analysis:

| | |
|---|---|
| NaSH, percent | 70–72 |
| $Na_2S$, percent max. | 2.5 |
| NaCl, percent max. | 0.8 |
| $Na_2SO_3NaHCO_3$, percent max. | 0.4 |
| Fe, p.p.m. max. | 5 |
| Cu, Ni, Cr, Mn, Pb, p.p.m. max. | 1 |
| Water of crystallization, percent | 28–26 |

As noted, the final reaction is carried out under a carefully controlled pH, in which the excess does not exceed an amount which would raise the pH to over 9.5. If such an excess is used, the excess per se will not harm the reaction, provided it is below the amount which causes gelation during the reaction, and provided the excess is effectively removed after the reaction period, resulting in a resin possessing substantially none of the excess reactant and having a terminal pH below that which will cause gelation during subsequent storage and use.

Of critical commercial importance in the present invention is the fact that it involves solid or powdered sodium sulfhydrate and no solvent is necessary in the course of the reaction. Normally, to obtain a mercaptan or thiol from a halide one must employ such measures as using a solution of sodium sulfhydrate prepared by saturating a sodium ethoxide solution with hydrogen sulfide gas. This reaction is often carried out while bubbling hydrogen sulfide through the reaction mixture, which is necessary to avoid the formation of sulfides or disulfide. At times, to avoid oxidation, the reaction is carried out with a reducing agent such as lithium aluminum hydride. Another technique is to run the reaction under pressure, or, alternatively, to maintain an inert atmosphere over the reactants in order to avoid oxidation. Great care must be taken to avoid conditions which promote disulfide and sulfide formations, and in general the procedures involved are so cumbersome as to render them commercially infeasible. The present method has been found to avoid the formation of undue amounts of disulfide and sulfide which would lead to gelation.

The patent to Zech, 2,581,464, indicates the reaction of sodium sulfhydrate with polyhalohydrin ethers. It has been found in practice, however, that the conditions of this reaction are so specific and critical that the teaching is generally of limited applicability. The present invention contemplates the replacement reaction with polymers and particularly with polyether glycols, and commercial yields are made possible by careful control of the pH in accordance with the present invention.

By keeping the excess of alkali metal sulfhydrate sufficiently close to a stoichiometric equivalent, the system is kept essentially neutral and stable and thereby resists gelation. The salt formed as a by-product (the alkali metal halide) can be readily filtered off, and the resulting resin is very stable.

The epihalohydrins, and particularly epichlorohydrin, are particularly desirable because the resulting thiol terminated polymer has especially good activity of the terminal mercaptan by virtue of the influence of the hydroxyl group on the beta carbon. This enhanced activity of the mercaptan allows the use of curing agents not normally associated with thiol terminated liquid polymers such as liquid polysulfide resins. Also, in the use of conventional curing agents such increased activity has allowed the use of smaller amounts of curing agent and other additives, such as amines and accelerators. Decrease in these latter has been found to enhance the physical properties, such as resistance to moisture, stability, and color of the resultant elastomer.

The polymers resulting from the present invention require less peroxide and less accelerators in curing. Furthermore, they react with less pure and less costly grades of such peroxides; and are well suited for use with organic peroxides. The high level of such curing agents which is necessary for conventional polysulfides makes organic peroxides impractical due to the large amounts of by-products formed by the reaction and the harmful effect thereof. The polymers of the present invention require only a small fraction of the normal amounts of such peroxide and their accelerators. The polymers of this invention react well even with diolefins not normally having enough activation for reaction with regular liquid polysulfide resins. They react well with conventional epoxy resins often without the aid of catalysts or accelerators. Finally, the terminal groups of the polymers in the present invention are so sensitive to oxygen that it makes possible air cured systems, giving rise to an easily and economically fabricated one-package castable elastomers.

While it is possible to carry out the reaction in a solvent, it has been found that the polyol itself acts as a sufficient solvent, although it is inherently a rather poor solvent. This limited solvency apparently actually enhances the process. Where a solvent such as alcohol is used, the sulfhydrate, being in solution, reacts very quickly and leads to a moderately violent exothermic reaction which, on anything but laboratory scale, constitutes a definite processing problem. Where the polyol alone is the solvent, the limited solubility actually keeps the speed of reaction at an easily controllable rate. In addition, the absence of an external solvent eliminates the odor problem, because there are no solvent vapors refluxing and discharging the gases into the atmosphere; and of course the absence of an external solvent obviates the necessity for its removal at the end of the process.

Specific commercial polyoxyalkylene glycols which have been found to be satisfactory are tri-functional polyols which are propylene oxide derivatives of trimethylol propane. They may be further modified by termination with approximately 10% ethylene oxide so that the hydroxy groups are essentially primary. They vary in equivalent weight from 140 to over 2000. Tri-functional polyols, being propylene oxide derivatives of 1,2,6 hexane triol and having equivalent weights ranging from 1500 to 2100 have also been found to be satisfactory. A commercial tri-functional polyol derived from glycerol and having the greatest portion of its structure made up of repeating units of propylene oxide terminated with a small amount of ethylene oxide to give essentially primary hydroxyl groups has also been satisfactorily employed. The equivalent weights vary from approximately 1000 to 1650.

*Example 1*

As the first step in the process, there was added to one equivalent of a glycol, described above, 92.5 grams of epichlorohydrin and stannic chloride .$5H_2O$ (0.2% based on weight of polyol). The reaction was effected in a three neck glass equipped with stirrer, thermometer and condenser at a temperature of 110 degrees centigrade for 3 hours. The yield was quantitative and the trichlorohydrin produced was found to be pure enough without further treatment.

*Example 2*

As an alternative first step in the process, there was added to one equivalent of a glycol, described above, 101.8 grams (10% excess based on polyol) of epichlorohydrin and stannic chloride .$5H_2O$ (0.2% based on weight of polyol). The reaction was effected in a three neck glass equipped with stirrer, thermometer and condenser at a temperature of 110 degrees centigrade for 3 hours.

The yield was quantitative and the trichlorohydrin produced was found to be pure enough without further treatment.

Example 3

As an alternative for step one, 137.0 grams of epibromohydrin were used instead of the chloride compounds with production of a tribromohydrin of approximately the same purity yield.

Example 4

As an alternative for one, 151.0 grams (10% excess based on polyol) of epibromohydrin were used instead of the chloride compounds with production of a tribromohydrin of approximately the same purity yield.

Example 5

As an alternative to any of the preceding four examples, anhydrous stannic chloride may be satisfactorily utilized as catalyst, the amount used being 0.1% based on the weight of the polyol.

Example 6

As in Example 2, a trichlorohydrin was produced from a trifunctional polyol having an equivalent weight of approximately 1476 and being a propylene oxide derivative of trimethylolpropane. The second step was effected by adding to the trichlorohydrin of the first step 80.0 grams of commerical sodium sulfhydrate. The mixture was heated with agitation at 100 degrees centigrade for 1.5 hours. It changed in color from straw yellow to green to white signifying completion of reaction. The mixture was then filtered, yielding a clear yellow material having a mercaptan equivalent of 0.51, and containing 1.59% sulfur and less than 0.1% chlorine.

Example 7

To the same trichlorohydrin as in the immediately preceding example, 88.0 grams (10% excess based on polyol) commerical sodium sulfhydrate were added. Upon completion of reaction, the pH of the mixture was found to be 8.3. This pH was not sufficiently high to cause gelation. The mixture was filtered and determined to have a pH of 6.5.

Example 8

To the trichlorohydrin of the polyol of Example 6 was added 104.0 grams (30% excess based on polyol) of commercial sodium sulfhydrate. Upon completion of reaction, the mixture gelled and had a pH of 9.8. This is not a satisfactory system, and shows that control of the pH during reaction and at termination is essential is essential to a commercial system.

Example 9

As in Example 4, a tribromohydrin was produced from a trifunctional polyol having an equivalent weight of approximately 1476 and being a propylene oxide derivative of trimethylol propane. To this tribromohydrin was added 88.0 grams (10% excess based on polyol) of commercial sodium sulfhydrate and heated with agitation at 100 degrees centigrade for 1.5 hours. The terminal pH was 6.7 and the salt removed by filtration, yielding an almost water-white liquid having the same properties as exhibited by the trimercaptans produced from the trichlorohydrins. Analysis showed 1.58% sulfur and less than 0.1% bromine present.

Example 10

To the trichlorohydrin of the polyol of Examples 6 and 9 was added 88.0 grams (10% excess based on polyol) commerical sodium sulfhydrate and heated with agitation at 100 degrees centigrade for 3.0 hours. The mixture had a terminal pH of 6.5 and appeared to be identical to the trimercaptan produced in Example 6.

Example 11

To the trichlorohydrin of the polyol of Examples 6 and 9 was added 80.0 grams commercial sodium sulfhydrate and heated with agitation at 130 degrees centigrade for 1.5 hours. The material appeared to be and was substantially identical with the ones produced in Examples 6–10.

Example 12

As in Example 2, a trichlorohydrin was produced from a trifunctional glycol having an equivalent weight of approximately 143 and being a propylene oxide derivative of trimethylol propane. To the trichlorohydrin was added 88.0 grams (10% excess based on polyol) of commercial sodium sulfhydrate. With agitation, immediate exotherm was noted. A cooling bath containing an ice-salt mixture was required to maintain the reaction temperature below 100 degrees centigrade. The exotherm was accompanied by an immediate precipitation of salt and the solution began to turn a deep brown. Upon completion of the exotherm, the mixture was heated at 100 degrees centigrade for a period of 1.5 hours with agitation. The mixture gradually became heavier with precipitated salt and turned a deeper brown. The salt was removed by filtration and the product liquid had a pH of 6.8, a mercaptan equivalent of 4.21, and contained 14.6% sulfur and 0.1% chlorine.

Example 13

From the same glycol as used in Example 12, but reacted to a tribromohydrin in the manner of Example 4, 80.0 grams of commerical sodium sulfhydrate was added. The procedure followed was substantially the same as in Example 12 and the reaction produced substantially identical, as were the final products, with bromine being substituted for chlorine.

Example 14

A trifunctional polyol having an equivalent weight of approximately 242 and being a propylene oxide derivative of trimethylol propane, was reacted with epichlorohydrin as in Example 2, and to the resulting trichlorohydrin was added 80.0 grams of commercial sodium sulfhydrate. With agitation an immediate rise in temperature was noted to 120 degrees centigrade. Upon termination of the exotherm, heat was added to maintain the mixture at 110 degrees centigrade for a period of 1.5 hours. Upon completion of the reaction the mixture showed a pH of 6.7 and the salt was then removed by filtration. The solution was clear amber, having a mercaptan equivalent of 2.73; and contained 7.11% sulfur and 0.07% chlorine.

The same reaction was effected with epibromohydrin of Example 4 in place of the epichlorohydrin of Example 2 with substantially identical results except for the replacement of bromine for chloride.

Example 15

The system of Example 14 was repeated except that 92.0 grams (15% excess on polyol) of commercial sodium sulfhydrate was employed. The terminal pH was 8.5. However, after the salt was removed by filtration, the remaining resin was found to have a pH of 6.9. The clear amber material produced was identical to that of Example 14.

Example 16

Example 14 was repeated with 104.0 grams (30% excess on polyol) of commercial sodium sulfhydrate. Before completion of reaction the mixture gelled.

Example 17

A trifunctional polyol having an equivalent weight of 499 and being a propylene oxide derivative of trimethylol propane was reacted with epichlorohydrin as in Example 2 and to the resulting trichlorohydrin was added with agitation 88.0 grams (10% excess on polyol) commercial sodium sulfhydrate. The exotherm raised the temperature to 100 degrees centigrade which was then externally maintained for 1.5 hours. The terminal pH was 6.6. Salt was removed by filtration. The resulting trimercaptan was almost water-white and had a mercaptan equivalent of 1.51; and contained 4.64% sulfur and 0.2% chlorine.

The same system was run employing epibromohydrin as in Example 4 in place of epichlorohydrin of Example 2 and the result was substantially the same.

*Example 18*

A trifunctional polyol having an equivalent weight of 1470 and being a propylene oxide derivative of trimethylol propane was reacted and to the resulting trichlorohydrin was added 80.0 grams commercial sodium sulfhydrate. The mixture was agitated and heated at 100 degrees centigrade for 2.5 hours. The terminal pH was 6.8 and upon removal of salt was a pale yellow liquid of low viscosity having a mercaptan equivalent of 0.43.

*Example 19*

A trifunctional polyol having an equivalent weight of 1998 and being a propylene oxide derivative of 2,2,6 hexanetriol, was reacted as in Example 2, and to the resulting trichlorohydrin was added 88.0 grams (10% excess on polyol) of commercial sodium sulfhydrate. The mixture was agitated and heated at 115 degrees centigrade for 2.0 hours. The resulting clear yellow-white liquid having a pH of 6.6, was decanted from the precipitated salt cake and analyzed to have a mercaptan equivalent of 0.39, and contained 1.33% sulfur and 0.1% chlorine.

*Example 20*

The process of Example 19 was repeated except that the initial glycol was a trifunctional polyol having an equivalent weight of 1560. The resulting trichlorohydrin was treated with 80.0 grams of commercial sodium sulfhydrate, at 115 degrees centigrade for 2.25 hours. The resulting canary yellow liquid had a terminal pH of 6.5 after filtration of the salt and a mercaptan equivalent of 0.41, and contained 1.36% sulfur and 0.2% chlorine.

*Example 21*

Example 19 was substantially repeated except that the starting glycol was a trifunctional polyol derived from glycerol having an equivalent weight of 975 and with the greatest portion of its structure consisting of repeating units of propylene oxide terminated with small amounts of ethylene oxide. The intermediate trichlorohydrin was reacted with 80.0 grams of commercial sodium sulfhydrate, agitated at 100 degrees centigrade for 1.5 hours. The resulting mixture had a pH of 6.4 and the salt was then removed by filtration. Analysis showed a mercaptan equivalent of 0.36, and containing 2.44% sulfur, and 0.1% chlorine. The liquid polymers resulting from the process of the present invention are readily curable in many ways, as the following examples will show.

*Example 22*

To the resin produced in Example 6, the following blends were made and dispersed over a 3-roll paint mill. Upon the addition of the indicated curing agents the compounds cured to an elastomeric state. The properties make them suitable as a 2-part castable elastomer and useable as a sealant or as industrial caulking and glazing compounds:

| Materials | Compound 1 | Compound 2 |
| --- | --- | --- |
| Resin from Example #6 | 470 | 410 |
| Adhesion Promotors | 10 | 40 |
| Inert Fillers | 100 | 400 |
| Thixotropic agent | 10 | 10 |
| Aluminum flakes | 100 | |
| | 690 | 860 |
| Cure Agent: | | |
| Cumene Hydroperoxide | | 26 |
| 50% PbO$_2$-inert Plasticizer | 69 | |
| | 759 | 886 |

*Example 23*

The resin resulting from Example 21 was mixed with calcium carbonate in a weight ratio of 100 to 100 and then passed over a mill. The pale yellow-white material was then mixed with 10 parts of a manganese dioxide catalyst (50:50, MnO$_2$:inert plasticizer) and allowed to cure. The result was an excellent rubberlike substance suitable as a caulking and glazing compound.

*Example 24*

The resin of Example 21 was intimately mixed with inert filler material (278 parts to 278 parts by weight), and milled. To the resulting creamy white material was added 0.5 part of amine (triethylene diamine) and then 12 parts of divinyl sulfone were stirred into the mixture. In 30 minutes the mixture had cured to a hard, firm material suitable as a caulking or glazing compound.

*Example 25*

The resin of Example 17 was stirred together with inert filler (100 parts to 150 parts by weight) and then passed over a mill with 0.05 part of an accelerator, tetramethyl thiuram disulfide. The material was then cured by the use of 10 parts of the aforementioned manganese dioxide catalyst, producing an excellent elastomer possessing good elongation, tensile strength, and resiliency.

*Example 26*

The trimercaptan of Example 15 was intimately mixed with inert filler (100 parts to 125 parts by weight) and 0.5 part of amine (triethylene diamine) and 7.5 parts of manganese dioxide catalyst were added. The resulting cure formed an elastomer having the properties of rubber suitable as a caulking and glazing compound.

*Example 27*

The resin of Example 15 was mixed with a commercial epoxy resin having an epoxide equivalent of 195 (50 parts to 50 parts and 10 grams of an accelerator, 2,4,6-tri(dimethylaminomethyl) phenol was added. After 24 hours at room temperature the mixture had cured to a hard thermoplastic resin having excellent impact resistance.

*Example 28*

To the polymer of Example 17 was added a commercial epoxy resin having an epoxide equivalent of 210 (36 parts to 72 parts) and 10 grams of an accelerator, 2,4,6-tri(dimethylaminomethyl) phenol. A hard, thermoplastic resin was formed after 10 hours at room temperature.

The thiol terminated polyethers described hereinbefore may be readily cured and converted to useful elastomers by the use of various curing agents, notably organic and inorganic peroxides. Such elastomers can be cast in liquid or paste state and subsequently cured in place, with or without the application of heat and/or pressure. They find utility as industrial sealants and caulking and glazing compounds, both pourable and non-sag. When thinned with solvents they are useful as elastomeric coatings.

The conversion of the glycols to commercially useful elastomers usually involves, in addition to the curing agent, further modifiers, re-enforcing pigments, and additives desirable to the production of various end products. From a commercial standpoint, the preferred curing agent is presently cumene hydroperoxide. Other organic peroxides such as benzoyl peroxide, t-butyl hydroperoxide, and methyl ethyl ketone peroxide have been found to be quite satisfactory. Inorganic peroxides which have been successfully used as curing agents are: lead, manganese, zinc, and tellurium dioxide. Divinyl sulfone has also been used as a curing mechanism.

The two-part system resulting in the commercial elastomer of the present invention may be typically described as follows: To a thiol terminated polyoxyalkylene glycol resin of approximately 4000 molecular weight there are added modifying resins (thiol terminated polymers of higher or lower molecular weights) in order to vary flexibility, elasticity, hardness and cure rate. Subsequently, there is incorporated adhesion promoters and plasticizers such as phenolic, epoxy and carboxyl containing resins and other promoters common to the art. Then, if desired, inert fillers, reinforcement pigments, and thixotropic agents may be added. The entire mixture is dispersed over a 3-roll paint mill and the compounds cured to an elastomeric state in which the resulting product is a castable elastomer useable as a sealant or as an industrial caulking and glazing compound.

Specific examples are as follows, being patterned after the following detailed description:

To 20 parts by weight of a thiol terminated polyoxyalkylene polymer with an approximate molecular weight of 4000 were added 12 parts by weight thiol terminated polyoxyalkylene polymer with an approximate molecular weight of 6000 and 5 parts of a thiol terminated polymer of approximately 1000 molecular weight and together with 6 parts by weight of a modified phenolic resin these were intimately mixed and blended on a rotary mixer. To the above resin blend were added 5 parts by weight dioctylphthalate, 2 parts by weight stearic acid, 2 parts by weight of a metallic soap, 2 parts by weight of titanium dioxide and 45 parts by weight of calcium carbonate. The mixture was thoroughly mixed and then passed over a 3-roll mill. After processing as described above the white material was intimately mixed with 3 parts by weight of cumene hydroperoxide and allowed to cure. The result was a rubberlike elastomer with good tensile strength and elongation properties suitable for use as a caulking and glazing compound.

Physical properties of the elastomer resulting from the above were as follows:

Viscosity (poises) _____ 20,000
Work life (hrs.) _____ 6
Block flow (in.) _____ 0.0
Tack free time (hrs.) _____ 16
Hardness (Shore A) _____ 25
Tensile (p.s.i.) _____ 130
Elongation (percent) _____ 300
Tear (p.l.i.) _____ 28

The following table shows numerous variants on the above example:

where R is the polyoxyalkylene moiety of the polyoxyalkylene glycol condensation product of an alkylene oxide having from 2 to 4 carbon atoms and a polyhydric alcohol having more than 2 and not more than 6 carbon atoms and more than 2 and not more than 6 hydroxy groups, said glycol having a molecular weight of at least 400, and $n$ is a number greater than 2 and not greater than 6.

2. A polymer having the structure:

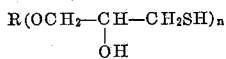

where R is the polyoxyalkylene moiety of a hydroxy-containing polyoxyalkylene glycol having a molecular weight of at least 400, wherein the alkylene groups contain 2 to 4 carbon atoms, and $n$ is a number greater than 2 and not greater than 6.

3. A polymer having the structure:

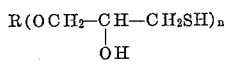

where R is the polyoxyalkylene moiety of the polyoxyalkylene glycol condensation product of propylene oxide and trimethylolpropane, and $n$ is a number greater than 2 and not greater than 6.

4. A process for the production of a liquid polymer having the structure:

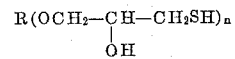

where R is the polyoxyalkylene moiety of a hydroxy-containing polyoxyalkylene glycol having a molecular weight of at least 400, wherein the alkylene groups contain 2 to 4 carbon atoms, and $n$ is a number greater than 2 and not greater than 6, said polymer having a viscosity of from 100 to 120,000 centipoise, and an equivalent weight of at least 150 as determined by the thiol content, said process consisting of reacting, with epihalohydrin, a hydroxy terminated liquid polyoxyalkylene glycol polymer having a molecular weight of at least 400, and which is a condensation product of an alkylene oxide having from 2 to 4 carbon atoms and about 0.01 to 17.0 mole percent, based on the alkylene oxide, of a polyhydric alcohol having not more than 6 carbon atoms and having more than 2 and not more than 6 hydroxy groups, said epihalohydrin being selected from the group

| Materials (parts by weight) | #1 | #2 | #3 | #4 | #5 | #6 | #7 | #8 | #9 | #10 | #11 |
|---|---|---|---|---|---|---|---|---|---|---|---|
| Thiol Terminated Polyoxyalkylene Glycol (4,000 M.W. Approx) | 20 | 32 | 43 | 32 | 32 | 32 | 32 | 32 | 32 | 32 | 32 |
| Thiol Terminated Polyoxyalkylene Glycol (6,000 M.W. Approx) | 12 | | | | | | | | | | |
| Thiol Terminated Polymer (1,000 M.W. Approx.) | 5 | 5 | 3 | | | | | | | | |
| Phenolic Resin | 6 | 6 | 7 | 6 | 6 | 8 | 6 | 6 | 6 | 6 | 6 |
| Plasticizer | 5 | 5 | 7 | | | | | | | | |
| Stearic Acid | 2 | 2 | | 2 | 2 | 2 | 2 | 2 | 2 | 2 | 2 |
| Metallic Soap | 2 | 2 | | 2 | 2 | 2 | 2 | 2 | 2 | 2 | 2 |
| Titanium Dioxide | 2 | 2 | 3 | 3 | 3 | 6 | 3 | 3 | 3 | 2 | 2 |
| Calcium Carbonate | 45 | 45 | 36 | 45 | 45 | 45 | 45 | 45 | 45 | 45 | 45 |
| Curing Agents (parts by weight): | | | | | | | | | | | |
| Cumene Hydroperoxide | 3 | 3 | 3 | | | | | | | | |
| Benzoyl Peroxide | | | | 3 | | | | | | | |
| T-butyl Hydroperoxide | | | | | 3 | | | | | | |
| Methyl Ethyl Ketone Peroxide | | | | | | | 1.5 | | | | |
| Divinyl Sulfone | | | | | | | | 5 | | | |
| Lead Dioxide | | | | | | | | | 5 | | |
| Manganese Dioxide | | | | | | | | | | 5 | |
| Zinc Dioxide | | | | | | | | | | | |
| Tellurium Dioxide | | | | | | | | | | | 1 |
| Characteristics: | | | | | | | | | | | |
| Viscosity (poise X 10³) | 20 | 20 | 0.6 | 20 | 20 | 20 | 20 | 20 | 20 | 20 | 20 |
| Work Life (hrs.) | 6 | 5 | 4 | 6 | 3 | 8 min | 1 | 8 | 12 | 5 | 2 |
| Block Flow (in.) | 0 | 0 | 1.5 | 0 | 0 | 0 | 0 | 0 | 0 | 0 | 0 |
| Tack Free Time (hrs.) | 16 | 16 | 16 | 24 | 16 | 4 | 12 | 24 | 30 | 16 | 16 |
| Hardness (Shore "A") | 25 | 35 | 25 | 20 | 25 | 20 | 20 | 40 | 40 | 38 | 20 |
| Tensile (p.s.i.) | 130 | 135 | 110 | | | | 240 | 240 | | | 90 |
| Elongation (percent) | 300 | 290 | 250 | | | | 725 | 250 | | | 500 |
| Tear (p.l.i.) | 28 | 30 | 22 | | | | | | | | |

What is claimed is:

1. A polymer having the structure:

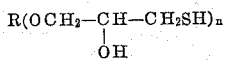

consisting of epichlorohydrin and epibromohydrin, and subsequently reacting the resultant with an alkali metal sulfhydrate, said last named reaction being effected with an amount of alkali metal sulfhydrate ranging between a stoichiometric amount and an excess thereover which produces a terminal pH of not more than 9.5.

5. The process of claim 4 wherein the alkylene oxide is propylene oxide.

6. The process of claim 4 wherein the polyhydric alcohol is trimethylolpropane.

7. A process for the production of a liquid polymer having the structure:

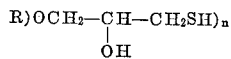

where R is the polyoxyalkylene moiety of a hydroxy-containing polyoxyalkylene glycol having a molecular weight of at least 400, wherein the alkylene groups contain 2 to 4 carbon atoms, and $n$ is a number greater than 2 and not greater than 6, said polymer having a viscosity of from 100 to 120,000 centipoise, and an equivalent weight of at least 150 as determined by the thiol content, said process consisting of reacting, with epihalohydrin, a hydroxy terminated liquid polyoxyalkylene glycol polymer having a molecular weight of at least 400, and which is a condensation product of an alkylene oxide having from 2 to 4 carbon atoms and about 0.01 to 17.0 mole percent, based on the alkylene oxide, of a polyhydric alcohol having not more than 6 carbon atoms and having more than 2 and not more than 6 hydroxy groups, said epihalohydrin being selected from the group consisting of epichlorohydrin and epibromohydrin, and subsequently reacting the resultant with an alkali metal sulfhydrate, said last named reaction being effected at a pH of not more than 9.5.

8. A process for the production of a liquid polymer having the structure:

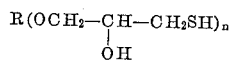

where R is the polyoxyalkylene moiety of a hydroxy-containing polyoxyalkylene glycol having a molecular weight of at least 400, wherein the alkylene groups contain 2 to 4 carbon atoms, and $n$ is a number greater than 2 and not greater than 6, said polymer having a viscosity of from 100 to 120,000 centipoise, and an equivalent weight of at least 150 as determined by the thiol content, said process consisting of reacting, with epihalohydrin, a mixture of hydroxy terminated liquid polyoxyalkylene glycol polymers, each having a molecular weight of at least 400, and being a condensation product of an alkylene oxide having from 2 to 4 carbon atoms and about 0.01 to 17.0 mole percent, based on the alkylene oxide, of a polyhydric alcohol having not more than 6 carbon atoms and having more than 2 and not more than 6 hydroxy groups, at least 40% of said alkylene oxide having more than 2 carbon atoms, said epihalohydrin being selected from the group consisting of epichlorohydrin and epibromohydrin;

and subsequently reacting the resultant with an alkali metal sulfhydrate, said last named reaction being effected at a pH no greater than 9.5, whereby the reaction and terminal product are prevented from gelling.

9. Process for the production of thiol terminated derivatives of polyoxyalkylene glycol polymers, said process consisting of:

reacting, with an epihalohydrin selected from the group consisting of epichlorohydrin and epibromohydrin, a hydroxy containing polyoxyalkylene glycol having a molecular weight of at least 400 and responding to the structure $R(OH)_n$ where R is the polyoxyalkylene moiety of a hydroxy-containing polyoxyalkylene glycol having a molecular weight of at least 400, wherein the alkylene groups contain 2 to 4 carbon atoms, and $n$ is a number greater than 2 and not greater than 6, and reacting the resultant with an alkali metal sulfhydrate, said last named reaction being effected at a pH no greater than 9.5, whereby the reaction and terminal product are prevented from gelling.

References Cited by the Examiner

UNITED STATES PATENTS 2,581,464   1/1952   Zech _____ 260—348.6

CHARLES B. PARKER, *Primary Examiner.*

DELBERT R. PHILLIPS, *Assistant Examiner.*